Figure 1:
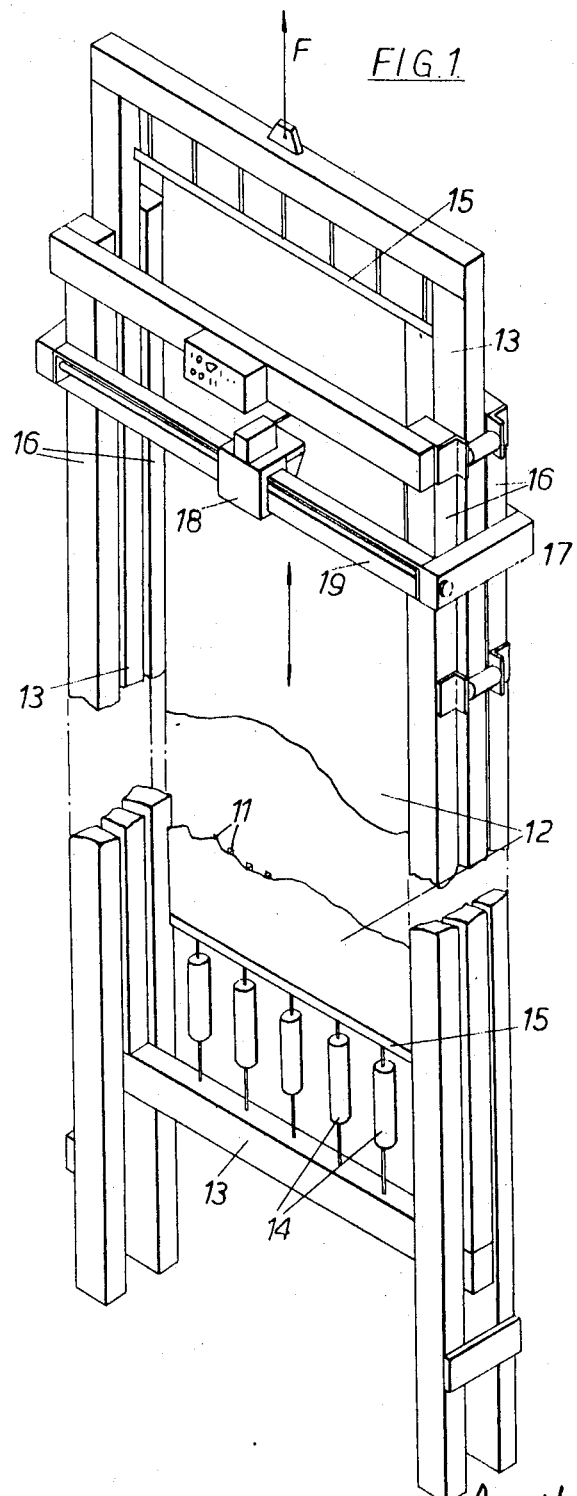

United States Patent

[11] 3,624,341

| [72] | Inventor | Roy Howard Hazelhurst<br>Ashton-under-Lyne, England |
|---|---|---|
| [21] | Appl. No. | 52,835 |
| [22] | Filed | July 7, 1970 |
| [45] | Patented | Nov. 30, 1971 |
| [73] | Assignee | Hawker Siddeley Aviation Limited<br>Kingston-upon-Thames, Surrey, England |
| [32] | Priority | July 23, 1969 |
| [33] | | Great Britain |
| [31] | | 37,125/69 |

[54] WELDING
5 Claims, 5 Drawing Figs.

[52] U.S. Cl. .................................................... 219/117 R,
219/137, 219/105
[51] Int. Cl. ....................................................... B23k 11/00
[50] Field of Search ........................................... 219/137,
117, 102, 105

[56] References Cited
UNITED STATES PATENTS
3,517,158   6/1970   Briggs .......................... 219/102

*Primary Examiner*—J. V. Truhe
*Assistant Examiner*—J. G. Smith
*Attorney*—Dowell & Dowell ABSTRACT: A welding method in which the component parts to be welded are subjected to tensile loading in the direction of the weld seam, during the actual welding process, in order to avoid undesired development of overall curvature or undulations in the welded work due to a distortion upon local heating and subsequent shrinkage. The work material can, by this tensile loading, be stressed up to 90 percent approximately of the stress at yield point of the material.

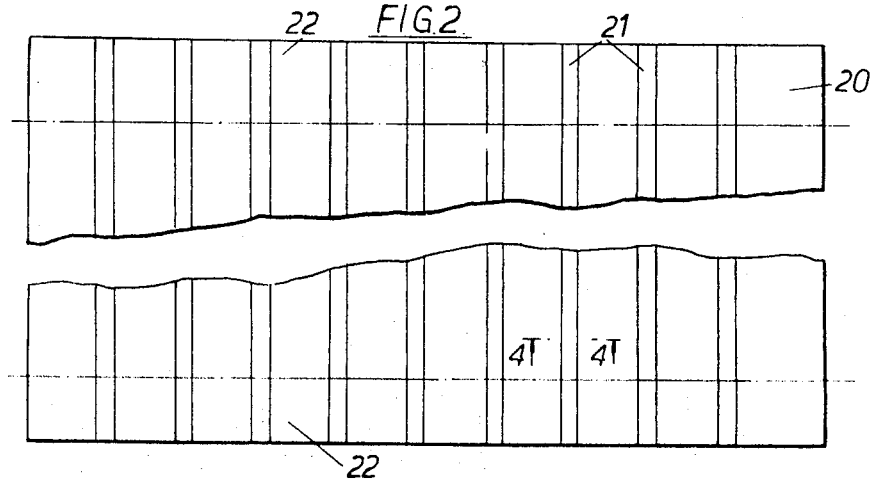
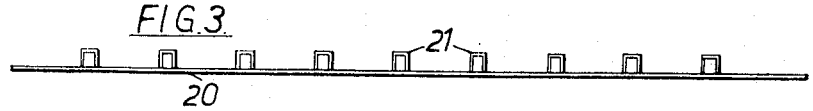
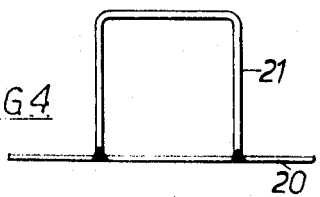
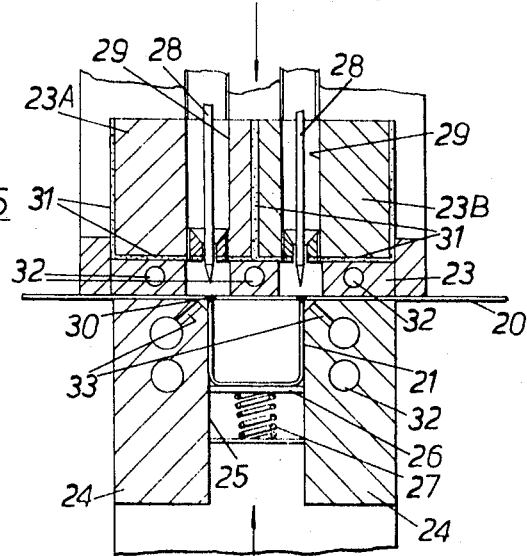

WELDING

This invention relates to welding, and especially the welding of panels and similar large components of comparatively thin section such as are used in aircraft construction.

Current trends in the design of aircraft structures with greater efficiency involve the use of welding as a means of reducing weight and producing parts more economically. However, a major problem is the distortion which takes place due to the local heating and the subsequent shrinkage of the weld metal. The effect of weld shrinkage can be to produce a general overall curve in a component, or in the case of stringer skin panels, an overall curvature coupled with local wrinkles or undulation of the skin between stringers.

One method of removing distortion after welding is to stretch-straighten the component by the application of a tensile load in the direction of the weld seam; whilst this technique is practical it demands the plastic deformation of the material which in certain circumstances could affect the material or weld metal properties. It is an object of this invention to deal with the distortion troubles which have been described in a novel way.

According to the present invention, the component parts to be welded together are held under tensile load, applied in the direction of the weld seam, during the welding operations. This technique has proved successful in overcoming distortion and as a means of holding and positioning parts for welding.

Experiments have shown that for a given material, gauge and welding conditions a tensile stress level can be imposed during welding such that when the load is removed, the parent metal stress balances the shrinkage stress leaving the component in a stiff stable condition.

Welding of component parts under tension in this manner is applicable, as far as we are aware, to all weldable materials and may be used to advantage in conjunction with many known welding processes, among which are:

Tungsten Inert Gas Welding
Metal Inert Gas Welding
Plasma Arc Welding
Metal Arc Welding
Submerged Arc Welding
Electron Beam Welding
Resistance Welding The component parts to be welded are tensioned to a similar stress level, which is maintained constant throughout the welding operation. The load application system should be capable of maintaining a constant stress level, i.e. compensating for thermal expansion of component parts during the welding operation and contraction upon cooling. Various means may be used to achieve this, two of which are a compensating spring system or a hydraulic system.

The optimum stress level in each case depends upon the material and welding parameters, i.e. heat input, speed, etc., which can only be assessed by experimentation; stresses up to 90 percent of the yield point stress of the material being welded have been used.

Welds made by automatic fusion welding techniques, i.e. butt welds and fillet welds on thin gauge materials (one-fourth inch and thinner) are normally made with the work on either side of the joint fully clamped. The clamping methods conventionally used are quite complex and designed to give intimate, uniform, clamping pressure and hence a constant heat sink. The practical limitations of designing clamping systems of this nature become progressively more difficult as the joint length increases, the maximum known clamping length being in the order of 25 feet long. Clamping systems of this type, apart from holding and positioning the joint, localize the heat necessary to make the weld and thus minimize distortion.

Experiments with similar clamping methods to the conventional ones described above but with tension loads applied to the material have proved that the distortion previously experienced can be substantially eliminated.

There will now be described, by way of example, apparatus for welding in accordance with the invention, which apparatus is shown pictorially and diagrammatically in the accompanying drawings.

In the drawings:

FIG. 1 is a diagrammatic pictorial view of a machine for welding in accordance with the invention, FIGS. 2 and 3 are, respectively, a plan and end elevation of particular work to be welded, FIG. 4 is a part view of this work in section on the line 4—4 of FIG. 2, and FIG. 5 is a detail cross-sectional view showing a form of welding head for dealing with work such as is shown in FIGS. 2 to 4.

Referring firstly to FIG. 1, assume a number of angle section stringers 11 are required to be welded to one side of a sheet of metal 12. The sheet 12 together with the angle sections 11 is positioned and fastened within a vertical rectangular frame type holding fixture 13, such that a uniform longitudinal tension can be applied to both the sheet and angle section material. The tension load is applied and maintained throughout the welding operation by a series of hydraulic jacks 14 of other such tensioning devices acting within the holding frame 13, the ends of the work being held in transverse clamp bars 15.

The vertical longitudinal edges of the frame 13 are held in stationary vertical guides 16 which allow the frame to be traversed upwards in the direction of the arrow F during the welding operation. As the work is moved in this manner it passes up through a yoke or frame 17 supporting the welding equipment and mounted on the guides 16. The welding head 18 which produces the vertical weld seam can be adjusted horizontally on a rail 19 for performing welds at different positions across the width of the work.

The work can be performed either by making fillet welds at the same side of the sheet 12 as the angles 11 or by making through welds from the opposite side of the work sheet.

A particularly advantageous way of employing the invention is to utilize it in combination with the draw welding technique.

The draw welding method is a means of holding component parts together by drawing them locally through a die prior to and during a fusion welding operation. This die may be stationary and the component motivated or vice versa. A combination of the tension welding technique and the draw welding technique is an attractive means or producing welded fabrications in any required lengths.

The component parts can be assembled together in their correct positions and a tension load applied, holding the parts in line over their entire length. The draw welding die is to hold the component parts together locally and is assembled together with the welding equipment and traversed the length of the weld seam. Alternatively, the die and welding equipment may be stationary and the tension frame complete with the work components under tension traversed.

FIGS. 2 to 4 show typical work to be welded and FIG. 5 a welding head arrangement for performing this work. The work consists of a titanium alloy aircraft panel 20 to one face of which longitudinal stringers 21 of channel or U section are to be welded. The panel is 0.04 inch wide and 7 ft. long and there are nine parallel stringers placed at 2.75 inches pitch across the width. The stringers are each of 0.022 inch thick material bent to form substantially an open-sided square section with an external side dimension of 0.625 inch. The welded length of each stringer 21 is only 5 ft. 6 inches, the remainder of the 7 feet length being excess material utilized to provide a margin 22 at each end of the work for clamping purposes.

The welding process employed is tungsten inert gas welding, with the work maintained under a tensile stress in the longitudinal direction of 28 tons per sq. inch. FIG. 5 shows how to work is drawn through a welding head which includes an upper clamping block assembly 23, bearing on the face of the panel 20 opposite to the stringers 21, and a lower clamping block assembly comprising spaced parallel blocks 24 engaging the panel 20 and defining between them a channel 25 in which one of the stringer sections 21 is a sliding fit, the channel containing also a sliding platen 26 which is urged upward by springs 27 to press the stringer into place against the panel 20. The welding is performed by making welds 30 through the work by means of a pair of electrodes 28 housed in channels 29 in the upper block assembly. Portions 23A, 23B of the upper block assembly 23 are insulated, as at 31, from the clamping portion and from one another to constitute welding torches carrying the electrodes.

The welding torches have water cooling and argon feed. Both upper and lower clamping block assemblies have water cooling passages 32; and argon is supplied not only to the two torches but also through passages 33 in the lower clamping block and along the interior of the stringer section 21.

The technique is not limited to welding stringers (or other such stiffeners) which are parallel to each other or to the center line of the panel. Provided the stringers are straight and can be individually tensioned, the welding operation may be carried out in a similar manner, the welding torches and dies being automatically transversed simultaneously in both the longitudinal and transverse panel directions. The relative rate of transverse to longitudinal movement can be programmed to suit the angle of the stringer to the center line of the overall panel.

The various welding techniques described may be used, and the welding traverse may be carried out, in either the horizontal or vertical plane, to produce welded components of almost any length.

What I claim is:

1. A method of uniting component workpieces by means of long seam welds, comprising the steps of:
   positioning the workpieces to define at least one seam;
   applying to the workpieces so positioned a tensile load in the direction parallel to the seam so defined;
   and welding the workpieces together progressively along the seam while maintaining the tensile load constant during welding both upon the portions of the workpieces being instantaneously united by the welding operation and upon the portions already united.

2. A method according to claim 1, wherein a tensile load is selected that applies a stress in the range up to 90 percent approximately of the yield point stress of the material to be welded.

3. A method according to claim 1 wherein the tensile load is applied by means that maintains constant stress regardless of thermal expansion and contraction of the work.

4. A method according to claim 1, wherein the component parts to be welded are assembled in a frame that carries means to apply the tensile load to said parts, and the frame is traversed relatively to a further frame carrying at least one welding head to produce at least one weld seam.

5. A method according to claim 1, wherein the weld seam is produced by draw welding in which the component parts to be welded are held together at the region of welding by drawing them locally through a die and clamping assembly.

* * * * *